Oct. 6, 1953     W. P. SCHMITTER     2,654,267
MULTIPLE POWER TAKE-OFF TRANSMISSION
Filed Dec. 29, 1949
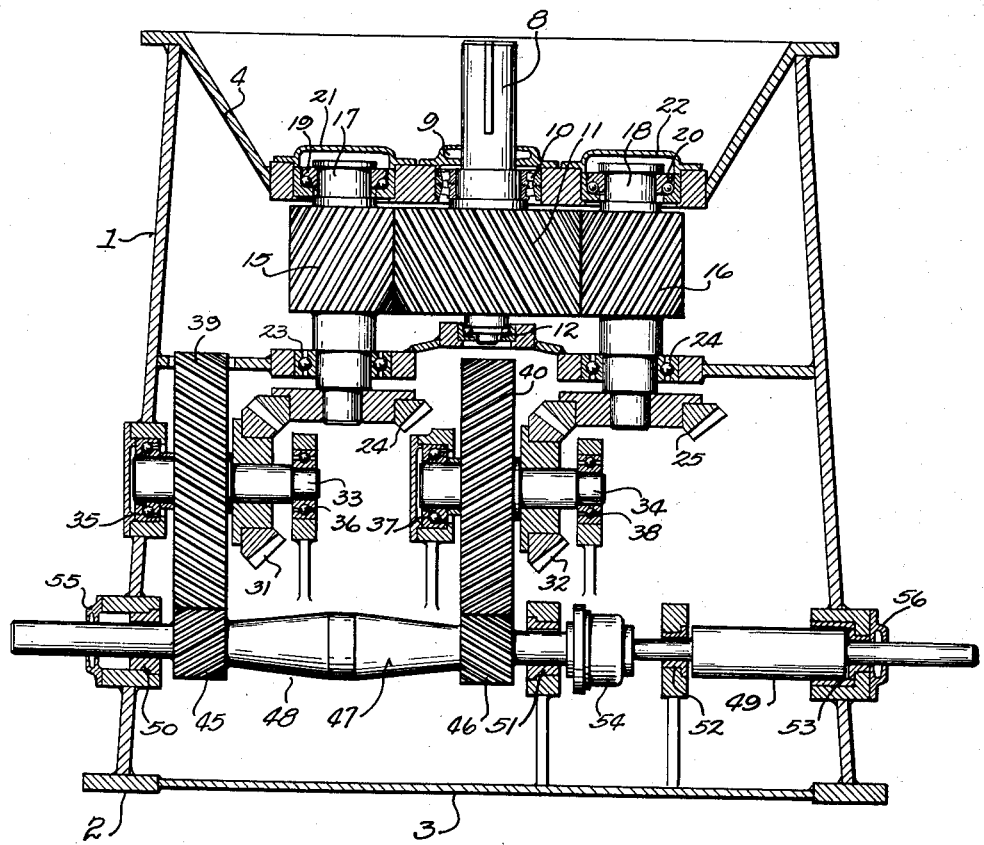
Inventor
WALTER P. SCHMITTER
By
Miles Henninger
Attorney Patented Oct. 6, 1953

2,654,267

UNITED STATES PATENT OFFICE 2,654,267

MULTIPLE POWER TAKEOFF TRANSMISSION

Walter Paul Schmitter, Milwaukee, Wis., assignor to The Falk Corporation, Milwaukee, Wis., a corporation of Wisconsin Application December 29, 1949, Serial No. 135,637

7 Claims. (Cl. 74—665)

This invention relates to improvements in geared power transmissions in which different quantities of power are to be taken from the same output shaft at different points.

It is, therefore, an object of the present invention to provide a geared power transmission in which different quantities of power may be taken simultaneously from the ends of the same output pinion shaft without imposing tilting forces on such shaft, which would disturb the full line tooth contact, resulting from bearing clearances and shaft deflections.

Another object of the invention is to provide a power transmission of the type above indicated and in which two gear trains are provided for delivering power to the same output shaft and in which the loads and reactions on the two gear trains are automatically equalized by axial movement of the output pinion shaft.

Objects and advantages other than those above set forth, will be apparent from the following description when read in connection with the accompanying drawing which is a vertical sectional view of a power transmission embodying the present invention.

Generally, the present invention is shown as embodied in a transmission to which power is applied by a shaft having a main helical gear driving two similar gear trains. Each of the similar gear trains includes a first helical gear driven by the main gear, and a first bevel gear mounted on the same shaft with the first helical gear. The first bevel gear meshes with a second bevel gear mounted on a shaft with a second helical gear, the second helical gear meshing with a helical pinion gear on the output shaft. In the present embodiment of the invention, the input shaft is vertical while the output shaft is horizontal with the ends thereof of different size for delivering widely varying quantities of power. It will be noted that the power is applied by the two gear trains on the same side of the output shaft thus avoiding the imposing of tipping or tilting forces on such shaft, and that such shaft is mounted for free axial movement to equalize the forces in the two gear trains. The output shaft has been shown with its axis in the vertical plane through the axis of the main gear, but such output shaft may be shifted to either side of such plane as desired without affecting operation of the transmission.

Referring particularly to the drawings by characters of reference, the numeral 1 designates a housing which is shown as frusto-conical in shape and is provided with an annular flange 2 at the larger base for supporting the transmission. An end plate 3 is fixed to the inner edge of the base flange to close the larger end of the housing. The smaller end of the housing is closed by an end plate 4. The particular shape of the entire housing has no bearing on the invention, such shape being dictated by the special use for which the transmission was to be first utilized; namely, to receive power from a "pancake" type of diesel engine and to deliver the main flow of power to an electric generator, and an auxiliary flow of power to a scavenging blower for the engine, the whole being particularly designed for shipboard use. In such first use, power is supplied to the transmission at 400 R. P. M. and is delivered to the final or output shaft at 3600 R. P. M. with 1700 horsepower being taken by the generator and 100 horsepower required by the blower.

An input shaft 8 extends through the end plate 4 in which it is sealed by a suitable seal indicated at 9, and such shaft is mounted in bearing 10 for supporting a main gear 11, the end of the shaft within the housing being supported by a bearing 12 mounted on the housing. Bearings 10 and 12 are of the type for withstanding axial thrust thus retaining the shaft 8 and the gear 11 in a given position.

A pair of similar gears 15 and 16 are mounted on shafts 17 and 18 which are supported in thrust bearings 19 and 20 in the housing end plate 4, to mesh with gear 11, the outer ends of the shafts 17, 18 being enclosed by removable plates 21 and 22 and the inner ends of such shafts being supported in steady bearings 23, 24 mounted on the housing. The shafts 17 and 18 severally have overhung therefrom the bevel gears 24 and 25.

The bevel gears 24, 25 severally mesh with bevel gears 31, 32 on shafts 33, 34 supported in bearings 35, 36 and 37, 38, respectively mounted in the housing. The shafts 33, 34 have severally mounted thereon gears 39 and 40 severally meshing with gears 45 and 46 on an output shaft generally designated 47. The gears 39, 45 and 40, 46 are pairs of single helical gears of equal angle but of opposite hand. It will be noted that power is applied from the gears 39, 40 to the output shaft 47 on the same side of such shaft so that the pressures on the shaft 47, that is the tangential and separating forces are in the same direction, the thrusts due to the helix angles being in the opposite directions, which results in full line tooth contact. There is, therefore, no tendency toward tilting or tipping of the shaft.

The output shaft is preferably divided into two portions 48 and 49 supported, respectively, in bearings 50, 51 and 52, 53 (mounted on the housing) with the shaft portions joined by a flexible coupling of a well known type which is indicated generally at 54 and which allows for axial movement between shaft portions and for both angular and parallel misalignment of the shaft portion axes. The ends of the output shaft 47 extend through the housing through suitable seals 55, 56. It will be noted that the output shaft portions differ materially in size dependent on the quantities of power to be taken from the several ends. The output shaft is so supported in the bearings as to be shiftable axially to allow automatic equalization of the forces on the two gear trains as above described and therefore on the main driving gear also. The flexible coupling avoids the transmission from one end of the shaft to the other of different characteristic reactions of the different loads on the shaft ends, thus securing smooth operation of both of the driven devices.

The present invention, accordingly, provides a power transmission in which different quantities of power are taken from the two ends of a single shaft. Flow of power in the transmission is automatically and equally divided between two paths and is so applied to the shaft as to avoid exerting forces on the shaft which would tend to cause tilting or tipping thereof. A balance of forces throughout the whole of the transmission is thus achieved which contributes largely to the smoothness of operation and to the durability of the transmission.

Although but one embodiment of the present invention has been illustrated and described, it will be apparent that various changes and modifications may be made therein without departing from the invention as defined in the appended claims.

I claim:

1. In a geared power transmission for simultaneously taking different quantities of power from the ends of a shaft, a housing, an input shaft supported in and extending from the housing, a main gear mounted on the input shaft in the housing and restrained from axial movement thereof, a plurality of separate and similar gear trains driven by the main gear, the gear trains severally including single helical gears and the corresponding helical gears of the several trains being of equal angle but opposite hand, and an output shaft having the ends thereof extending from the housing and divided into two portions of different diameters for simultaneously delivering different quantities of power, the gear trains delivering power to the output shaft at spaced locations along the length of the larger diameter portion and the output shaft being mounted for axial movement to equalize loads and reactions between the several gear trains.

2. In a geared power transmission for simultaneously taking different quantities of power from the ends of a shaft, a housing, an input shaft supported in and extending from the housing, a main gear mounted on the input shaft within the housing and restrained from axial movement thereof, a pair of separate and substantially identical gear trains driven by the main gear, an output shaft having the ends thereof extending from the housing for delivering different quantities of power and axially movable, the output shaft being divided into portions of unequal diameter and the gear trains delivering power to the larger diameter portion of the output shaft at locations spaced along the length of the larger shaft portion, the gear trains including corresponding single helical gears of equal angle but opposite hand.

3. In a geared power transmission for simultaneously taking different quantities of power from the ends of a single shaft, a housing, an input shaft supported in and extending from the housing, a main gear mounted on the input shaft and within the housing, an output shaft having the ends thereof extending from the housing for delivering different quantities of power from the shaft ends, the output shaft being divided into portions of unequal length, bearings supporting the output shaft for axial movement for equalizing the load and reactions between the pair of gear trains, and a pair of substantially identical gear trains, the gear trains comprising single helical gears meshing with the main gear at opposite ends of a diameter thereof and bevel gears for changing direction of power flow through the transmission and corresponding helical gears delivering power to the output shaft at locations spaced along the length thereof and adjacent the bearings of the longer shaft portion, the pairs of corresponding helical gears being of equal angle but opposite hand and delivering power to the same side of the output shaft to avoid tipping of the shaft.

4. In a geared power transmission for simultaneously taking different quantities of power from the two ends of an output shaft, a housing, an input shaft supported in and extending from the housing and held therein against axial movement, a main gear mounted on the input shaft, a pair of substantially identical gear trains including corresponding single helical gears, and an output shaft divided into two portions of different diamter, the gear trains delivering power to only the larger diameter portion of the output shaft and at locations spaced axially of the larger portion of the shaft.

5. In a geared power transmission for simultaneously taking different quantities of power from the two ends of an output shaft, a housing, an input shaft supported in and extending from the housing, the input shaft being held against axial movement, the main gear mounted on the input shaft within the housing, a plurality of separate and similar gear trains driven by the main gear, the gear trains each including a first single helical gear meshing with the main gear at the ends of a diameter thereof and bevel gears driven by the first said gear, and pairs of single helical gears driven by the bevel gears, and an output shaft divided into the portions of different diameter, the gear trains severally transmitting power to the output shaft portion of larger diameter, the output shaft being mounted in the housing for axial movement thereof whereby the loading of the gear trains is equalized, the bevel gears providing for change in action and reaction of the gear trains.

6. In a geared power transmission for simultaneously taking different quantities of power from the ends of an output shaft driven by the gearing, a housing, an input shaft supported in and extending from the housing and held against axial movement thereof, a main single helical gear mounted on the input shaft, a pair of substantially identical and spatially separated gear trains including corresponding single helical gears, all the helical gears being of equal angle but opposite hand, an output shaft divided into two portions of different diameters, bearings supporting the output shaft for axial movement thereof, the gear trains severally supplying power to the larger portion of the output shaft on the same side thereof and between and adjacent the bearings thereof for avoiding tilting of the output shaft, and an axially and angularly flexible coupling joining the output shaft portions for axial movement thereof relative to each other for automatically equalizing the power transmitted by the gear trains and for maintaining full line contact of the teeth of the meshing gears.

7. In a geared power transmission the combination of a housing, a low speed shaft journalled therein, a high speed shaft journalled for rotation and free axial movement within said housing, a pair of single helical pinions of opposite hand on said high speed shaft, and a pair of separate driving connections between said shafts, each of said connections comprising a single helical gear meshing with one of said pinions and means including right angle gearing connecting said single helical gear with said low speed shaft, said single helical pinions being axially movable with said high speed shaft to distribute the torque load between said separate connections, and said single helical gears being disposed at the same side of said high speed shaft to avoid imposing a tipping action on the latter.

WALTER PAUL SCHMITTER.

References Cited in the file of this patent

UNITED STATES PATENTS

| Number | Name | Date |
|---|---|---|
| 429,134 | Kleinstiver | June 3, 1890 |
| 1,351,318 | Alquist | Aug. 31, 1920 |
| 1,727,084 | Super | Sept. 3, 1929 |
| 2,126,691 | Schmitter | Aug. 9, 1938 |
| 2,156,739 | Schmitter | May 2, 1939 |
| 2,225,863 | Halford et al. | Dec. 24, 1940 |
| 2,327,787 | Heintz | Aug. 24, 1943 |
| 2,386,367 | Taylor | Oct. 9, 1945 |
| 2,392,313 | Dahlstrand | Jan. 8, 1946 |